United States Patent
Nash et al.

(10) Patent No.: US 8,427,632 B1
(45) Date of Patent: Apr. 23, 2013

(54) IMAGE SENSOR WITH LASER FOR RANGE MEASUREMENTS

(75) Inventors: Phillip T. Nash, Xenia, OH (US); Gregory C. Best, San Francisco, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 729 days.

(21) Appl. No.: 12/655,106

(22) Filed: Dec. 23, 2009

(51) Int. Cl.
*G01C 3/00* (2006.01)
*G01C 5/00* (2006.01)
*G01C 3/08* (2006.01)

(52) U.S. Cl.
USPC .............. 356/3.1; 356/3; 356/3.01; 356/3.03; 356/3.06; 356/3.12; 348/135; 348/136; 348/139; 348/140

(58) Field of Classification Search .......... 348/135–137, 348/139, 140; 356/3–4.03, 11
See application file for complete search history.

(56) References Cited

U.S. PATENT DOCUMENTS

| 4,760,269 A * | 7/1988 | McKenna | 250/559.38 |
| 4,948,258 A * | 8/1990 | Caimi | 356/603 |
| 7,375,801 B1 * | 5/2008 | Briscoe et al. | 356/3.1 |
| 7,477,400 B2 * | 1/2009 | Gutierrez et al. | 356/609 |
| 7,589,825 B2 * | 9/2009 | Orchard et al. | 356/4.03 |
| 7,720,554 B2 * | 5/2010 | DiBernardo et al. | 700/56 |
| 2003/0193658 A1 * | 10/2003 | Uomori et al. | 356/3.1 |

FOREIGN PATENT DOCUMENTS

WO    WO 2009/100773 A1    8/2009

OTHER PUBLICATIONS

M.D. Chapman, M.G. Farley; "Monocular SLAM"; GPS World; Sep. 1, 2008.

* cited by examiner

*Primary Examiner* — Sath V Perungavoor
*Assistant Examiner* — Nathnael Aynalem
(74) *Attorney, Agent, or Firm* — Boris G. Tankhilevich (57) ABSTRACT

A method of image-based positioning is provided. The method comprises: (A) providing an image-capturing device integrated with a focused-radiation source and a processor; the image-capturing device further comprises an image sensor; (B) capturing an image of an object located in a field of view (FOV) of the image-capturing device by using the image sensor; (C) directing a focused ray of radiation generated by the focused-radiation source to the object located in the (FOV) of the image-capturing device; (D) detecting at least one return signal generated by reflection of the focused ray of radiation from the object located in FOV of the image-capturing device by using the image sensor; (E) characterizing the object located in a field of view (FOV) of the image-capturing device by using each return signal; and (F) processing each return signal in order to determine a distance from the object located in the FOV to the image-capturing device.

28 Claims, 4 Drawing Sheets

IMAGE SENSOR WITH LASER FOR RANGE MEASUREMENTS

TECHNICAL FIELD

The technology relates to the field of navigation.

BACKGROUND

This application describes a method and apparatus that is capable of accurately determining the distance from a camera to an object using image-based measurements instead of time-of-flight measurements.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of image-based positioning is provided. The method comprises: (A) providing an image-capturing device integrated with a focused-radiation source and a processor; the image-capturing device further comprises an image sensor; (B) capturing an image of an object located in a field of view (FOV) of the image-capturing device by using the image sensor; (C) directing a focused ray of radiation generated by the focused-radiation source to the object located in the (FOV) of the image-capturing device; (D) detecting at least one return signal generated by reflection of the focused ray of radiation from the object located in FOV of the image-capturing device by using the image sensor; (E) characterizing the object located in a field of view (FOV) of the image-capturing device by using each return signal; and (F) processing each return signal in order to determine a distance from the object located in the FOV to the image-capturing device.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
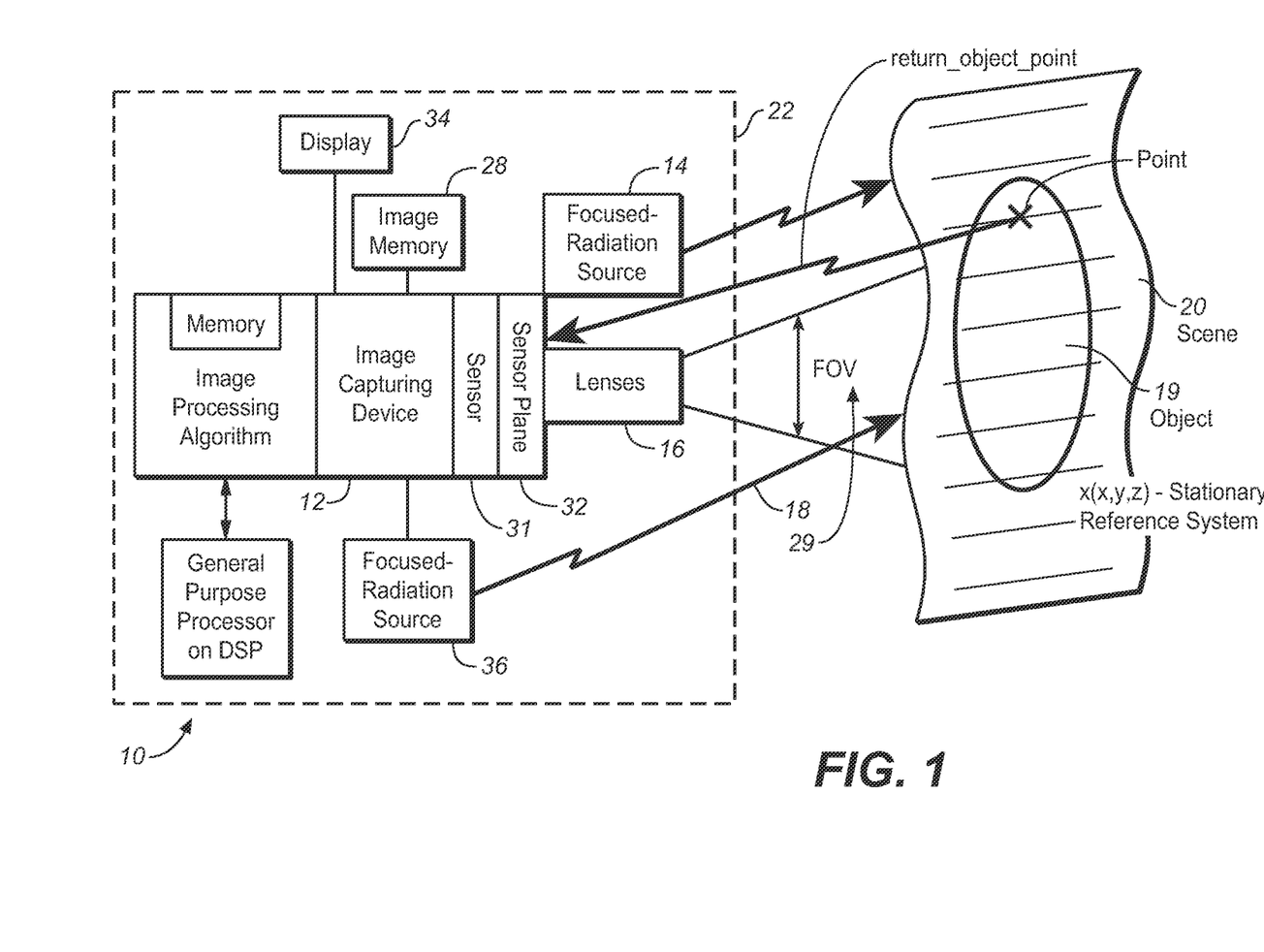
FIG. 1 depicts an image-based positioning apparatus in accordance with an embodiment of the present technology.

FIG. 1 depicts a block diagram 10 including an image-based positioning apparatus 22 in accordance with an embodiment of the present technology.

In an embodiment of the present technology, the image-based positioning apparatus 22 further comprises: an image capturing device 12 configured to perform an image-capture of an object 19 located in a scene 20.

In an embodiment of the present technology, the image capturing device 12 is a light-tight box in which an image of the object 19 located in the scene 20 is formed by a pinhole or lenses 16 at an image sensor plane 32. Still video and digital cameras store the images in a solid-state memory 28, or on magnetic media or optical disks 28.

Except in a pinhole camera, which focuses the image on the film through a tiny hole, all other cameras use lenses 16 for focusing. The focal length of lenses, i.e., the distance between the rears of the lenses (when focused on infinity) and the imaging device, determines the angle of view, or field of view (FOV) 29 and the size of objects as they appear on the imaging surface-sensor plane 32. The image is focused on that surface by adjusting the distance between the lenses and the surface.

In an embodiment of the present technology, the lens 16 further comprises a regular rectilinear lens.

In an embodiment of the present technology, the lens 16 further comprises a fisheye lens. A fisheye lens is a wide-angle lens that takes in an extremely wide, sometimes hemispherical image. Fisheye lenses are often used to shoot broad landscapes. Fisheye lenses achieve extremely wide angles of view by forgoing a rectilinear image, opting instead for a special mapping (for example: equisolid angle), which gives images a characteristic convex appearance. In this embodiment of the present technology, Field of View (FOV) 29 further comprises a wide angle FOV.

In an embodiment of the present technology, the lens 16 further comprises custom-calibrated lenses.

In an embodiment of the present technology, the image capturing device 12 further comprises a display 34 further comprising an optical display, a liquid crystal display (LCD), or a screen.

The fundamental element of an image of an object is the pixel which describes color or a grayscale within solid angular portion of the field of view.

Each pixel contains a series of numbers which describe its color or intensity. The precision to which a pixel can specify color is called its bit or color depth. The more pixels an image contains, the more detail it has the ability to describe.

Since a pixel is just a logical unit of information, it is useless for describing real-world dimensions unless you also specify their size. The term pixels per inch (PPI) are introduced to relate this theoretical pixel unit to real-world physical resolution.

"Pixels per inch" (PPI) is a very straightforward term. It describes just that: how many pixels an image contains per inch of distance in the horizontal and vertical directions on the object being imaged. For square pixels, there would be one PPI describing both the horizontal and the vertical relationships. For rectangular pixels, two PPI values may be required to describe the relationship. For pixels of other shapes, or in other arrangements, different PPI descriptions may be preferred but the conceptual relationship of pixels to physical dimensions remains the same.

A "megapixel" is simply a unit of a million pixels. A digital camera may use an image sensor array of megapixels (millions of tiny pixels) in order to produce an image. When the camera's shutter button is pressed and the exposure begins, each of these pixels has a "photo site" which stores photons. Once the exposure finishes, the camera tries to assess how many photons fell into each. The relative quantity of photons in each cavity are then sorted into various intensity levels, whose precision is determined by bit depth (0-255 for an 8-bit image).

Each cavity is unable to distinguish how much of each color has fallen in, so the above description would only be able to create grayscale images. One method used to extend digital image sensors to capture color information is to filter the light entering each cavity allowing the sensor to distinguish between light of different wavelengths. Commonly filters would distinguish between light in the visible ranges of Red (R), Green (G) and Blue (B). Other sensors may be designed with filters to select other spectral bands such as Infrared (IR) and Ultra-Violet (UV). The extension beyond RGB is discussed below.

Referring still to FIG. 1, the image capturing device 12 is selected from the group consisting of: {a visible camera; an infrared (IR) camera; an ultraviolet (UV) camera; a monochromatic camera; a multispectral camera; and a hyper spectral camera}.

A digital camera (or digicam for short) is a camera that takes video or still photographs, or both, digitally by recording images via an electronic image sensor. Digital cameras can do things film cameras cannot: displaying images on a screen immediately after they are recorded, storing thousands of images on a single small memory device, recording video with sound, and deleting images to free storage space. Some can crop pictures and perform other elementary image editing. Fundamentally they operate in the same manner as film cameras, typically using a lens with a variable diaphragm to focus light onto an image pickup device. The combination of the diaphragm and a shutter mechanism is used to admit the correct amount of light to the imager, just as with film; the only difference is that the image pickup device is electronic rather than chemical. Digital cameras are incorporated into many devices ranging from PDAs and mobile phones (called camera phones) to vehicles.

In an embodiment of the present technology, referring still to FIG. 1, the image capturing device 12 includes an infrared (IR) camera. A thermographic camera, sometimes called a FLIR (Forward Looking InfraRed), or an infrared camera less specifically, is a device that forms an image using infrared radiation, similar to a common camera that forms an image using visible light. Instead of the 450-750 nanometer range of the visible light camera, infrared cameras operate in wavelengths as long as 14,000 nm (14 μm). Infrared energy is just one part of the electromagnetic spectrum that encompasses radiation from gamma rays, x-rays, ultra violet, a thin region of visible light, infrared, terahertz waves, microwaves, and radio waves. A special camera can detect this radiation in a way similar to an ordinary camera does visible light. It works even in total darkness because ambient light level does not matter. This makes it useful for rescue operations in smoke-filled buildings and underground.

Images from infrared cameras tend to be, but are not necessarily, monochromatic because the cameras are generally designed with only a single type of image sensor responding to single wavelength range of infrared radiation. Sometimes these monochromatic images are displayed in pseudo-color, where changes in color are used rather than, or in addition to, changes in intensity to display changes in the signal.

Thermal imaging photography finds many other uses. For example, firefighters use it to see through smoke, find persons, and localize hotspots of fires. With thermal imaging, power line maintenance technicians locate overheating joints and parts, a telltale sign of their failure, to eliminate potential hazards. Thermal imaging cameras are also installed in some luxury cars to aid the driver.

Modern uncooled detectors typically all use image sensors that work by the change of resistance, voltage or current when heated by infrared radiation. These changes are then measured and compared to the values at the operating temperature of the image sensor.

In an embodiment of the present technology, referring still to FIG. 1, the image capturing device 12 includes an ultraviolet (UV) camera. Working in the ultraviolet (UV) portion of the spectrum offers significant advantages for some applications, For instance, for machine vision inspection reducing the effects of extraneous light can significantly improve contrast, speeding up or improving the accuracy of the system. With the use of CMOS cameras becoming widespread, a larger number of cameras now have significant UV sensitivity.

In an embodiment of the present technology, referring still to FIG. 1, the image capturing device 12 includes a monochromatic camera. In photography and computing, a grayscale or grayscale digital image is an image in which the value of each pixel is a single sample, that is, it carries only intensity information from a desired band of the electromagnetic spectrum.

In an embodiment of the present technology, the image capturing device 12 includes a multispectral camera. Multispectral imaging is a technology to acquire image data at specific wavelengths across the electromagnetic spectrum. The wavelengths may be separated by filters or by the use of instruments that are sensitive to particular wavelengths, including light from frequencies beyond the visible light range, such as infrared. Multi-spectral imaging can allow extraction of additional information that the human eye fails to capture with its receptors for red, green and blue.

Full-spectrum photography is a subset of multi-spectrum imaging. In practice, specialized broadband/full-spectrum film captures visible and near infrared light, commonly referred to as the "VNIR" Modified digital cameras can detect some ultraviolet, all of the visible and much of the near infrared spectrum, as most current digital imaging sensors are sensitive from about 350 nm to 1000 nm. An off-the-shelf digital camera contains an infrared hot mirror filter that blocks most of the infrared and a bit of the ultraviolet that would otherwise be detected by the image sensor, narrowing the accepted range from about 400 nm to 700 nm. Replacing a hot mirror or infrared blocking filter with an infrared pass or a wide spectrally transmitting filter allows the camera to detect the wider spectrum light at greater sensitivity. Without the hot-mirror, the red, green and blue (or cyan, yellow and magenta) colored micro-filters placed over the image sensor elements pass varying amounts of ultraviolet and infrared. A converted full-spectrum camera can be used for ultraviolet photography or infrared photography with the appropriate filters.

FluxData located in Rochester, N.Y. offers a series of 3CCD multi-spectral cameras of various resolution. Users can select from FluxData's a pre-configured 5 or 7 channel Red Green Blue (RGB) color model camera, or a Near Infrared (NIR) camera, or to configure a 3CCD camera with custom specified filters. A 3CCD multispectral camera provides the advantage of 3 unique imaging sensors with a single lens system.

In an embodiment of the present technology, referring still to FIG. 1, the image capturing device 12 includes a hyper spectral camera. Hyperspectral sensors look at objects using a vast portion of the electromagnetic spectrum. Certain objects leave unique 'fingerprints' across the electromagnetic spectrum. These 'fingerprints' are known as spectral signatures and enable identification of the materials that make up a scanned object. For example, having the spectral signature for oil helps mineralogists find new oil fields. Hyperspectral sensors collect information as a set of 'images'. Each image represents a range of the electromagnetic spectrum and is also known as a spectral band. These 'images' are then combined and form a three dimensional hyperspectral cube for processing and analysis. The acquisition and processing of hyperspectral images is also referred to as imaging spectroscopy.

The distinction between hyperspectral and multispectral is usually defined as the number of spectral bands. Multispectral data contains from tens to hundreds of bands. Hyperspectral data contains hundreds to thousands of bands. However, hyperspectral imaging may be best defined by the manner in which the data is collected. Hyperspectral data is a set of contiguous bands (usually by one sensor). Multispectral is a set of optimally chosen spectral bands that are typically not contiguous and can be collected from multiple sensors. Resonon West located in Bozeman, Mont. manufactures different Digital Imaging Spectrometers. It should be obvious to a person skilled in the art that the current technology is not limited to any spectral band. The necessary requirement for the use of a given spectrum of electromagnetic radiation area source of focused radiation in that band, and a sensor capable of measuring the reflected radiation in that band.

In an embodiment of the present technology, referring still to FIG. 1, the focused-radiation source 14 (or 36) is selected from the group consisting of: {a red-light laser; a blue-light laser; an IR laser; and an UV laser}.

The term blue laser is frequently applied to semiconductor laser diode based on gallium nitride. These new devices have applications in many areas ranging from optoelectronic data storage at high-density to medical applications. Nichia Corporation developed commercially viable blue and violet semiconductor lasers.

OnPoint Lasers, Ltd, located in Minneapolis, Minn., sells violet, green, and red Laser Pointers, produced in Taiwan.

Oerlikon Contraves GmbH in Stockach, Germany manufactures Infrared (IR) laser, and Infrared target illuminator.

UV laser diodes and UV solid-state lasers are manufactured to emit light in the ultraviolet range. Wavelengths currently available include 262, 266, 349, 351, 355 and 375 nm.

The current technology is not limited to using lasers as the focused radiation source. Any source of radiation projecting a sufficiently small area of illumination on the target scene may be used.

In an embodiment of the present technology, referring still to FIG. 1, the image sensor 31 is selected from the group consisting of: {a charge-coupled device (CCD); an active pixel sensor (APS) array; and a Complementary Metal Oxide Silicon (CMOS) sensor}.

An image sensor is a device that converts an optical image to an electric signal. It is used mostly in digital cameras and other imaging devices.

An active-pixel sensor (APS), also commonly written active pixel sensor, is an image sensor consisting of an integrated circuit containing an array of pixel sensors, each pixel containing a photodetector and an active amplifier. There are many types of active pixel sensors including the CMOS APS used most commonly in cell phone cameras, web cameras and in some DSLRs. Such an image sensor is produced by a CMOS process (and is hence also known as a CMOS sensor), and has emerged as an alternative to charge-coupled device (CCD) imager sensors. Today, most digital still cameras use either a CCD image sensor or a CMOS sensor. Both types of sensor accomplish the same task of capturing light and converting it into electrical signals.

A CCD is an analog device. When light strikes the chip it is held as a small electrical charge in each photo sensor. The charges are converted to voltage one pixel at a time as they are read from the chip. Additional circuitry in the camera converts the voltage into digital information.

In an embodiment of the present technology, referring still to FIG. 1, the image-based positioning apparatus 22 is configured to use the image sensor 31 and a focused light beam generated by the source of focused radiation 36 (or 14) to measure distance from an object 19 located in the scene 20 directly. Unlike an Electronic Distance Measurement (EDM) sensor configured to measure time of flight, or interferometry configured to measure distance, the method of the present technology uses the geometry of the optics to translate pixel offsets into distance.

One focus of the present technology is directed on measuring distance to the ground, however the same technique may be used to measure distance to arbitrary objects provided they are in the effective range of the image sensor 31 and provided that the light beam 18 produced by the focused radiation source 36 (hereafter referred to as a laser) falls on the object 19 to which distance is being measured.

Figure 2:
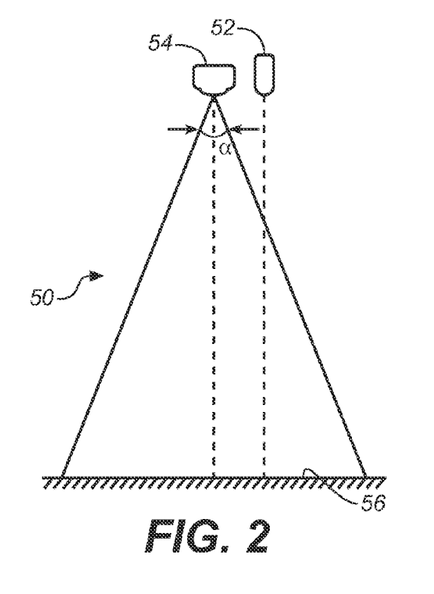
FIG. 2 depicts a diagram that shows one of the specific geometries that is used to implement the image-based positioning apparatus (of FIG. 1) of the present technology.
Figure 3:
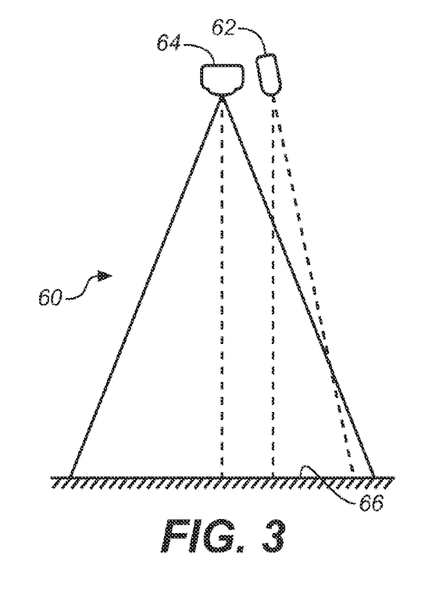
FIG. 3 depicts a diagram that shows one of the specific geometries that is used to implement the image-based positioning apparatus (of FIG. 1) of the present technology.
Figure 4:
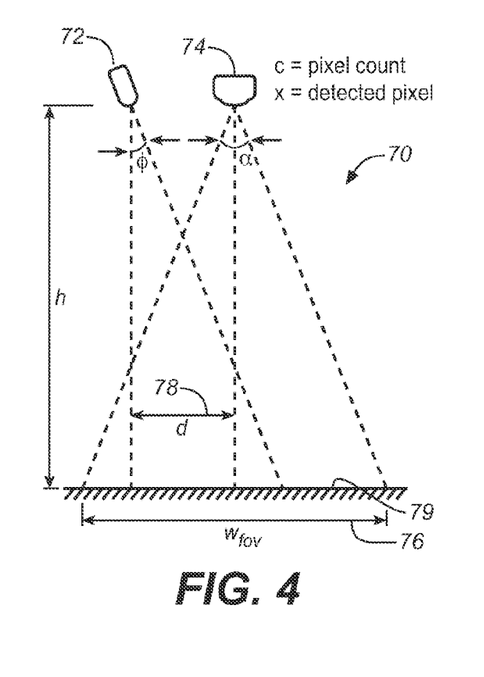
FIG. 4 depicts a diagram that shows one of the specific geometries that is used to implement the image-based positioning apparatus (of FIG. 1) of the present technology.
Figure 5:
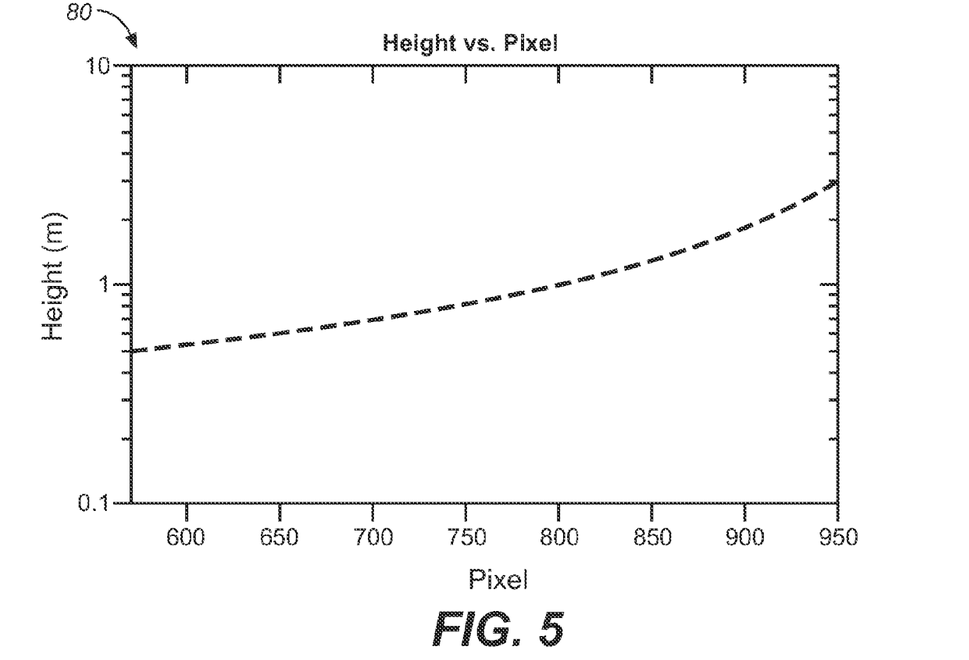
FIG. 5 illustrates the limited scale plot of simulation results of the image-based positioning apparatus (of FIG. 1) of the present technology in the height versus pixel coordinate system.
Figure 6:
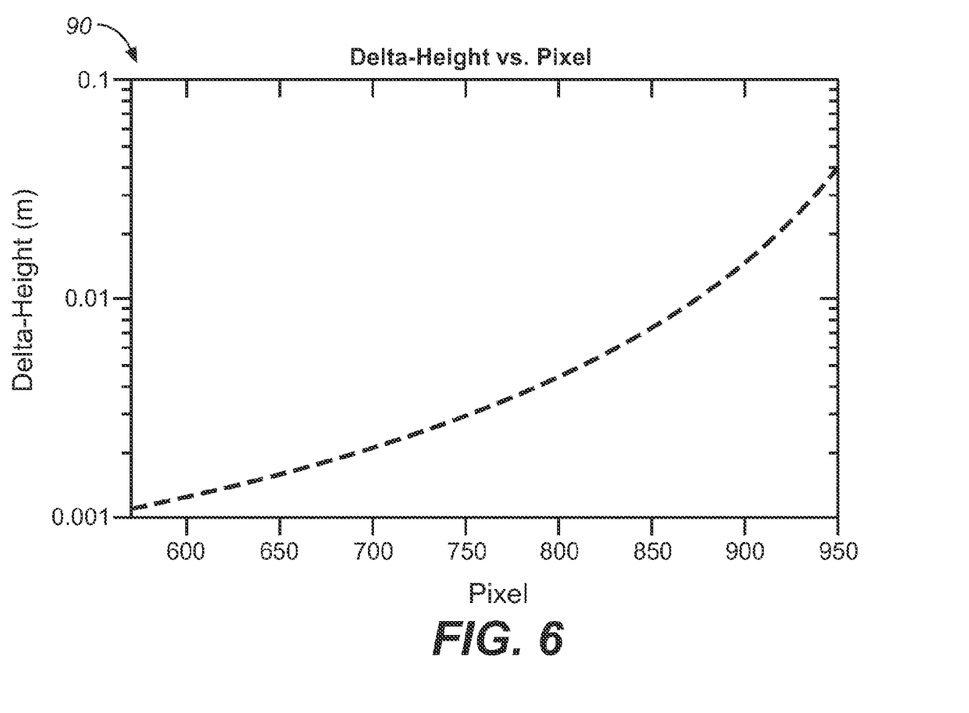
FIG. 6 depicts the limited scale plot of simulation results of the image-based positioning apparatus (of FIG. 1) of the present technology in the delta-height versus pixel coordinate system.
Figure 7:
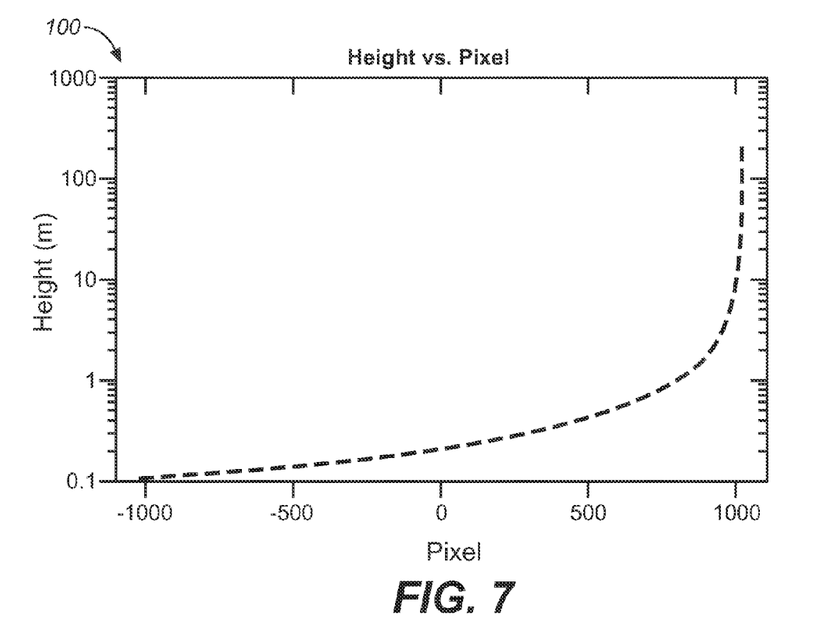
FIG. 7 illustrates the full scale plot of simulation results of the image-based positioning apparatus (of FIG. 1) of the present technology in the height versus pixel coordinate system.
Figure 8:
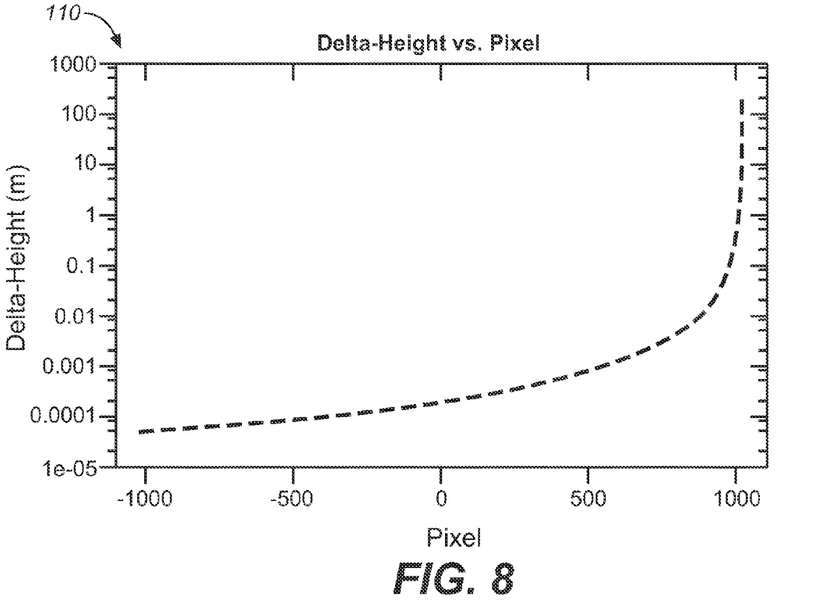
FIG. 8 depicts the full scale plot of simulation results the image-based positioning apparatus (of FIG. 1) of the present technology in the delta-height versus pixel coordinate system.

FIGS. 2, 3, and 4 depict three diagrams that show different geometries (50 of FIG. 2; 60 of FIGS. 3; and 70 of FIG. 4) that are used to implement the apparatus 22 (of FIG. 1) of the present technology.

In all of these cases it can be seen that as the camera is raised from the ground, the field of view increases, however the laser maintains a constant trajectory. As the camera is brought back from the ground the point at which the laser is detected in the frame moves within the frame—it is registered at different offsets within the field of view. This property can be used to calculate distance from the target from the pixel in the image sensor at which the laser is detected.

Beginning with the image sensor (31 of FIG. 1), there are two key parameters which effect operation of the apparatus 22 of the present technology: pixel count (c) and angle of view ($\alpha$). The pixel count is a basic parameter of the image sensor and for this discussion c refers to the number of pixels along a single, linear dimension, while α is a function of the image sensor size ($w_s$) and the focal length (f) of the associated optics.

One can show that:

$$\alpha = 2\tan^{-1}(w_s/2f)$$

$$f = w_s/2\tan(\alpha/2) \quad \text{(Eqs. 1)}$$

Note that there are often 3 angles of view discussed in regards to image sensors—the horizontal, vertical and diagonal. The same mathematics holds in all cases, and the horizontal is used in most examples below. The angle of view for each case (the horizontal, the vertical, and/or the diagonal) is calculated by putting that linear dimension for $w_s$ into the above equations (Eqs. 1).

The angle of view has wide ranging impacts on the imaging system. It impacts the magnification of the object being imaged, which can be important for some applications. The focal length, combined with the aperture, determines the depth of field—or the distances over which objects are in sharp focus. As an artifact of the magnification and limitations on shutter speed, the maximum motion dynamics of the system are established.

All of these factors and others impact the amount of light necessary for sufficient exposure. The desired focal length will also impact the physical dimensions of the system and may be limited by manufacturing constraints. All of these factors should be considered in a practical system, but this analysis is set aside in this discussion to focus on the ranging aspects.

For a given angle of view, the size w of field of view (FOV) ($w_{fov}$, in this discussion this is the linear area visible, as opposed to the angular view) at a given distance from the lens (h) can be calculated by simple trigonometry:

$$w_{fov} = 2h\tan(\alpha/2) \quad \text{(Eq. 2)}$$

The pixels each cover an area equally distributed across this length, each covering a linear distance of $(w_{px}) = (w_{fov})/c$ distance per pixel.

As shown in FIG. 4, the laser 72 is positioned with an offset from the center of the lens (d) 78 and projects at an angle (φ) relative to the optical axis of the lens. The laser point strikes the surface at the point ($s_1$) 79:

$$s_1 = d + h\tan(\phi) \quad \text{(Eq. 3)}$$

This laser point is detected by a pixel (x) of the image sensor 74 (of FIG. 4), where the sign of x indicates the direction of the pixel from center. The pixel x is the one that satisfies the following equation:

$$x\, w_{px} = s_1 \quad \text{(Eq. 4)}$$

Substituting from the above equations gives one the following equation:

$$(2xh/c)\tan(\alpha/2) = d + h\tan(\phi) \quad \text{(Eq. 5)}$$

from which one can derive relations for the detected pixel in terms of the camera height and, more interestingly, the camera height in terms of the detected pixel:

$$x = (d/h + \tan(\phi))/(2/c)\tan(\alpha/2)$$

$$h = d/((2x/c)\tan(\alpha/2) - \tan(\phi)) \quad \text{(Eqs. 6)}$$

Pixels are discrete on the image sensor, however it may be possible to measure x to better than integer resolution if the laser point crosses a pixel boundary or if the point is larger than a single pixel by using relative brightness among the pixels.

Having found a method for calculating height from a pixel value, it is important to establish the precision of that measurement, which requires calculating the range of height values represented by that single pixel—this can be found by calculating the derivative of height with respect to the pixel value (dh/dx):

$$dh/dx = (-)2(d/c)\tan(\alpha/2)/((2x/c)\tan(\alpha/2) - \tan(\phi))^2 \quad \text{(Eq. 7)}$$

Solving this relation for x allows onto determine which pixel gives specific precision:

$$x = (\tan(\phi)) + \sqrt{(-)2(d/c)\tan(\alpha/2)/dh/dx))/(2/c)\tan(\alpha/2)} \quad \text{(Eq. 8)}$$

Combining this result with the earlier equation for x as a function of height yields two equations useful for designing the image sensor system—one allows one to calculate the laser offset from the lens as a function of both height and precision, and the second allows one to calculate the angle of view based on the same parameters:

$$(d/h + \tan(\phi))/(2/c)\tan(\alpha/2) = (\tan(\phi)) + \sqrt{(-)2(d/c)\tan(\alpha/2)/dh/dx))/(2/c)\tan(\alpha/2)};$$

$$d = (-)(2h^2/c)\tan(\alpha/2)/(dh/dx);$$

$$\alpha = 2\tan^{-1}((-)d(dh/dx)/(2h^2/c)). \quad \text{(Eqs. 9)}$$

One remarkable result of these calculations is that laser angle (φ) is not a factor. Simulation confirms this (Please, see FIGS. 5, 6, 7, and 8). What these design equations do not capture, however, is that the laser angle does affect the operation of the system in that incorrectly setting this angle prevents the camera from capturing the full range of heights.

From the design equations one can see that increasing the angle of view forces one to move the laser further from the center of the lens, so one would like to use as narrow an angle of view as possible to keep the implementation small.

One can also see that higher resolution image sensors will allow one to move the laser inward. For example, one would select 2048 pixels across, which corresponds to a reasonably modern image sensor.

In order to maximize the use of the image sensor area, one would place the laser to one side of the lens and angle the beam across the full face of the image sensor at half the angle of view (20°). At the furthest extent, the beam will run parallel to the far side of the view and theoretically will never exceed the viewing area.

Using the design constraints of 40° angle of view and 2048 pixels across, with a target performance of 1 cm precision at 1.5 meters from the image sensor, one would need to position the image sensor 8 cm from the center of the lens.

This configuration gives reasonable accuracy measurements over the range of heights suitable for a handheld device. As can be seen in the full scale plots (FIGS. 7 and 8), the device is capable of measuring out to much greater distances, but with much lower precision.

The theoretical analysis overlooks a number of practical issues, not least of which is lens quality. The laser point is likely to occupy only a few pixels at most and will therefore be more strongly affected by lens distortion.

Another issue that is being ignored here is that each pixel of a typical color image sensor is actually a cluster of individual image sensors, each filtered to pass a narrow spectrum slice of different colors. While the precision values should still be constrained by the above equations, this raises the possibility of greater precision, but also the risk of a very small point of light not registering with the image sensor at all.

The upside of the image sensor architecture is that most commercial image sensors have two green sensors per pixel. If one chooses to use a green laser, this could effectively double our pixel density in the same physical area and halves the physical offset of the laser from the lens.

Because the measurements are based on where the laser crosses the plane of the lens, the physical placement can be brought in closer to the lens if it is also dropped down relative to the lens plane. In other words, the laser beam itself should keep the same trajectory, and the origin of the beam can be placed anywhere along that trajectory. With the example values above, the angle of the beam dictates that the lateral separation can't be reduced by much without significant "vertical" displacement.

There are a number of benefits to this system over other direct distance measuring techniques:

(i) The system is far less bulky than a full EDM, reducing both weight and physical size.

(ii) The system has the capacity to measure multiple points using the same image sensor array, merely by adding additional laser sources or using established methods for redirecting or splitting a single laser source. This allows redundancy in the measurement to minimize error, or to measure the tilt of the image sensor relative to the ground (see below).

(iii) The system can leverage existing image sensors to provide additional information, because the lasers are expected to obscure such a small portion of the frame and may be blinked off to allow a clean shot to be taken of the target.

(iv) The system can be made very accurate, rivaling EDM measurements over small ranges.

(v) Performance can be expected to improve rapidly with developments in image sensors and optics, both of which are subjects of intense research for consumer electronics. In particular, both range and precision benefit from increased pixel density in the image sensor (optics permitting).

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of image-based positioning using an apparatus comprising an image-capturing device integrated with a focused-radiation source and a processor; said method comprising:

(A) selecting a plane located in a field of view (FOV) from the group consisting of: {a sky-facing plane; a ground-facing plane; a backward (user-facing) plane; a forward-facing plane; a side-plane; and an arbitrary plane};

(B) pointing said image-capturing device camera at said selected plane located at said FOV of said image-capturing device;

(C) capturing an image of an object located in said plane on a display of said image-capturing device;

(D) directing a focused ray of radiation generated by said focused-radiation source to said object;

(E) detecting at least one return signal generated by reflection of said focused ray, of radiation from said object;

(F) displaying each said detected return signal from said object as a return_object_point on said display;

(G) measuring an offset data from each said displayed return_object_point to a reference point on said display;

(H) processing said offset data in order to determine a distance from said object located in said FOV to said display of said image-capturing device;

(I) repeating said steps (A-H) to generate a stream of distances from said object located in said FOV to said display of said image-capturing device;

and (K) if said object is stationary, processing said stream of distances from said object located in said FOV to said display of said image-capturing device to determine the display's movement over said selected plane.

2. A method of image-based positioning using an apparatus comprising an image-capturing device integrated with a plurality of focused-radiation sources and a processor; said method comprising:

(A) selecting a plane located in a field of view (FOV) from the group consisting of: {a sky-facing plane; a ground-facing plane; a backward (user-facing) plane; a forward-facing plane; a side-plane; and an arbitrary plane};

(B) pointing said image-capturing device camera at said selected plane located at said FOV of said image-capturing device;

(C) capturing an image of an object located in said plane on a display of said image-capturing device;

(D) directing a plurality of focused rays of radiation to said object; each said focused rays being generated by one said focused-radiation source;

(E) detecting at: least one return signal generated by reflection of one said focused ray of radiation from said object;

(F) displaying each said detected return signal from said object as a return_object_point on said display;

(G) measuring an offset data from each said displayed return_object_point to a reference point on said display;

(H) processing said set of offset data in order to determine a plurality of data associated with said object; wherein said plurality of data associated with said object is selected from the group consisting of: {a distance from said object to said display; an orientation of a line segment located within said object in reference to a line within said display; and a plurality of orientations of line segments located within said object in reference to a line within said display};

(I) repeating said steps (A-H) to generate a stream of data associated with said object located in said FOV to said display of said image-capturing device;

and (K) if said object is stationary, processing said stream of data associated with said object to determine the display's movement over said selected plane.

3. A method of image-based positioning using an apparatus comprising an image-capturing device integrated with a plurality of focused-radiation sources and a processor; said method comprising:

(A) selecting a plane located in a field on view (FOV) from the group consisting of: {a sky-facing plane; a ground-facing plane; a backward (user-facing) plane; a forward-facing plane; a side-plane; and an arbitrary plane};

(B) pointing said image-capturing device camera at: said selected plane located at said FOV of said image-capturing device;

(C) capturing a plurality of images, each said image being an image of an object located in said plane on a display of said image-capturing device;

(D) directing a plurality of focused rays of radiation to each said object; each said focused rays being generated by one said focused-radiation source;

(E) detecting at least one return signal generated by reflection of one said focused ray of radiation from each said object;

(F) displaying each said detected return signal from each said object as a return_object_point on said display;

(G) measuring an offset data from each said displayed return_object_point to a reference point on said display;

(H) processing said set of offset data in order to determine a plurality of data associated with each said object; wherein said plurality of data associated with said object is selected from the group consisting of: {a distance from each said object to said display; an orientation of a line segment located within each said object in reference to a line within said display; and a plurality of orientations of line segments located within each said object in reference to a line within said display};

(I) repeating said steps (A-H) to generate a stream of data associated with each said object located in said FOV to said display of said image-capturing device; and (K) if each said object is stationary, processing said stream of data associated with each said object to determine a topography of said selected plane.

4. A method of image-based positioning using an apparatus comprising an image-capturing device integrated with a focused-radiation source and a processor; said method comprising:

(A) selecting a plane located in a field of view (FOV) from the group consisting of: {a sky-facing plane; a ground-facing plane; a backward (user-facing) plane; a forward-facing plane; a side-plane; and an arbitrary plane};

(B) pointing said image-capturing device camera at said selected plane located at said FOV of said image-capturing device;

(C) capturing an image of an object located in said plane on a display of said image-capturing device;

(D) directing a focused ray of radiation generated by said focused-radiation source to said object;

(E) detecting at least one return signal generated by reflection of said focused ray, of radiation from said object;

(F) displaying each said detected return signal from said object as a return_object_point on said display;

(G) measuring an offset data from each displayed said return_object_point to a reference point on said display;

(H) processing said offset data in order to determine a distance from said object located in said FOV to said display of said image-capturing device;

(I) repeating said steps (A-H) to generate a stream of distances from said object located in said FOV to said display of said image-capturing device;

(K) if said object is stationary, processing said stream of distances from said object located in said FOV to said display of said image-capturing device to determine the display's movement over said selected plane;

and (L) recording said display's movement over said selected plane by using said processor.

5. The method of claim 4, wherein said step (A) further comprises:

(A1) selecting said image-capturing device from the group consisting of: {a multispectral camera; a hyper spectral camera; a visible camera; an infrared (IR) camera; an ultraviolet (UV) camera; and a monochromatic camera}.

6. The method of claim 4, wherein said step (A) further comprises:

(A2) selecting said focused-radiation source from the group consisting of: {a red-light laser; a green-light laser; a blue-light laser; an IR laser; and an UV laser}.

7. The method of claim 4, wherein said step (A) further comprises:

(A3) selecting said image sensor from the group consisting of: {a charge-coupled device (CCD); an active pixel sensor (APS) array; and a Complementary Metal Oxide Silicon (CMOS) sensor}.

8. The method of claim 4, wherein said step (B) further comprises:

(B1) selecting said FOV from the group consisting of: {a narrow angle FOV; and a wide angle FOV}.

9. The method of claim 4, wherein said step (B) further comprises:

(B1) selecting a plane located in said FOV from the group consisting of: {a sky-facing plane; a ground-facing plane; a backward (user-facing) plane; a forward-facing plane; a side-plane; and an arbitrary plane}.

10. The method of claim 4, wherein said image-capturing device further comprises a display; and wherein said step (B) of capturing said image of said object located in said field of view (FOV) of said image-capturing device by said image sensor further comprises:

(B2) projecting an image of said object captured by said image sensor on said display of said image-capturing device.

11. The method of claim 4, wherein said step (E) further comprises:

(E1) displaying said return signal from said object as a return_object_point on said display;

and (E2) measuring an offset data from said return_object_point to a reference point on said display.

12. The method of claim 4, wherein said step (F) further comprises:
(F1) processing said offset data in order to determine a distance from said object located in said FOV to said display of said image-capturing device.

13. A method of image-based positioning using an apparatus comprising an image-capturing device integrated with a plurality of focused-radiation sources and a processor; said method comprising:
(A) selecting a plane located in a field of view (FOV) from the group consisting of: {a sky-facing plane; a ground-facing plane; a backward (user-facing) plane; a forward-facing plane; a side-plane; and an arbitrary plane};
(B) pointing said image-capturing device camera at said selected plane located at said FOV of said image-capturing device;
(C) capturing an image of an object located in said plane on a display of said image-capturing device:
(D) directing a plurality of focused rays of radiation to said object; each said focused rays being generated by one said focused-radiation source;
(E) detecting at least one return signal generated by reflection of one said focused ray of radiation from said object;
(F) displaying each said detected return signal from said object as a return_object_point on said display;
(G) measuring an offset data from each said displayed return_object_point to a reference point on said display;
(H) processing said set of offset data in order to determine a plurality of data associated with said object; wherein said plurality of data associated with said object is selected from the group consisting of: {a distance from said object to said display; an orientation of a line segment located within said object in reference to a line within said display; and a plurality of orientations of line segments located within said object in reference to a line within said display};
(I) repeating said steps (A-H) to generate a stream of data associated with said object located in said FOV to said display of said image-capturing device;
(K) if said object is stationary, processing said stream of data associated with said object to determine the display's movement over said selected plane;
and
(L) recording said display's movement over said selected plane by using said processor.

14. The method of claim 13, wherein said step (A) further comprises:
(A2) selecting said focused-radiation source from the group consisting of: {a red-light laser; a green-light laser; a blue-light laser; an IR laser; and an UV laser}.

15. The method of claim 13, wherein said step (A) further comprises:
(A3) selecting said image sensor from the group consisting of: {a charge-coupled device (CCD); an active pixel sensor (APS) array; and a Complementary Metal Oxide Silicon (CMOS) sensor}.

16. The method of claim 13, wherein said step (B) further comprises:
(B1) selecting said FOV from the group consisting of: {a narrow angle FOV; and a wide angle FOV}.

17. The method of claim 13, wherein said step (B) further comprises:
(B1) selecting a plane located in said FOV from the group consisting of: {a sky-facing plane; a ground-facing plane; a backward (user-facing) plane; a forward-facing plane; a side-plane; and an arbitrary plane}.

18. The method of claim 13, wherein said image-capturing device further comprises a display; and wherein said step (B) of capturing said image of said object located in said field of view (FOV) of said image-capturing device by said image sensor further comprises:
(B2) projecting an image of said object captured by said image sensor on said display of said image-capturing device.

19. The method of claim 13, wherein said step (E) further comprises:
(E1) displaying said return signal from said object as a return_object_point on said display;
and
(E2) measuring an offset data from said return_object_point to a reference point on said display.

20. The method of claim 13, wherein said step (F) further comprises:
(F1) processing said offset data in order to determine a distance from said object located in said FOV to said display of said image-capturing device.

21. A method of image-based positioning using an apparatus comprising an image-capturing device integrated with a plurality of focused-radiation sources and a processor; said method comprising:
(A) selecting a plane located in a field of view (FOV) from the group consisting of: {a sky-facing plane; a ground-facing plane; a backward (user-facing) plane; a forward-facing plane; a side-plane; and an arbitrary plane};
(B) pointing said image-capturing device camera at said selected plane located at said FOV of said image-capturing device;
(C) capturing a plurality of images, each said image being an image of an object located in said plane on a display of said image-capturing device;
(D) directing a plurality of focused rays of radiation to each said object; each said focused rays being generated by one said focused-radiation source;
(E) detecting at least one return signal generated by reflection of one said focused ray of radiation from each said object;
(F) displaying each said detected return signal from each said object as a return_object_point on said display;
(G) measuring an offset data from each said displayed return_object_point to a reference point on said display;
(H) processing said set of offset data in order to determine a plurality of data associated with each said object; wherein said plurality of data associated with said object is selected from the group consisting of: {a distance from each said object to said display; an orientation of a line segment located within each said object in reference to a line within said display; and a plurality of orientations of line segments located within each said object: in reference to a line within said display};
(I) repeating said steps (A-H) to generate a stream of data associated with each said object located in said FOV to said display of said image-capturing device;
(K) if each said object is stationary, processing said stream of data associated with each said object to determine a topography of said selected plane;
and
(L) recording said topography of said selected plane by using said processor.

22. The method of claim 21, wherein said step (A) further comprises:
(A2) selecting said focused-radiation source from the group consisting of: {a red-light laser; a green-light, laser; a blue-light laser; an IR laser; and an UV laser}.

23. The method of claim 21, wherein said step (A) further comprises:
(A3) selecting said image sensor from the group consisting of: {a charge-coupled device (CCD); an active pixel sensor (APS) array; and a Complementary Metal Oxide Silicon (CMOS) sensor}.

24. The method of claim 21, wherein said step (B) further comprises:
(B1) selecting said FOV from the group consisting of: {a narrow angle FOV; and a wide angle FOV}.

25. The method of claim 21, wherein said step (B) further comprises:
(B1) selecting a plane located in said FOV from the group consisting of: {a sky-facing plane; a ground-facing plane; a backward (user-facing) plane; a forward-facing plane; a side-plane; and an arbitrary plane}.

26. The method of claim 21, wherein said image-capturing device further comprises a display; and wherein said step (B) of capturing said image of said object located in said field of view (FOV) of said image-capturing device by said image sensor further comprises:
(B2) projecting an image of said object captured by said image sensor on said display of said image-capturing device.

27. The method of claim 21, wherein said step (E) further comprises:
(E1) displaying said return signal from said object as a return_object_point on said display; and
(E2) measuring an offset data from said return_object_point to a reference point on said display.

28. The method of claim 21, wherein said step (F) further comprises:
(F1) processing said offset data in order to determine a distance from said object located in said FOV to said display of said image-capturing device.

* * * * *